(12) United States Patent
McGinley et al.

(10) Patent No.: US 9,983,415 B2
(45) Date of Patent: May 29, 2018

(54) EYEGLASS FRAME SYSTEM WHERE LENSES CAN MOVE FROM ONE FRAME TO ANOTHER

(71) Applicants: Sean McGinley, Providence Forge, VA (US); Matt Proffitt, Providence Forge, VA (US); Michael Broz, Providence Forge, VA (US)

(72) Inventors: Sean McGinley, Providence Forge, VA (US); Matt Proffitt, Providence Forge, VA (US); Michael Broz, Providence Forge, VA (US)

(73) Assignee: KLIX FRAMES (USA) LLC, Portland, OR (US)

( * ) Notice: Subject to any disclaimer, the term of this patent is extended or adjusted under 35 U.S.C. 154(b) by 0 days. days.

(21) Appl. No.: 15/019,858

(22) Filed: Feb. 9, 2016

(65) Prior Publication Data
US 2017/0227786 A1 Aug. 10, 2017

(51) Int. Cl.
*G02C 1/00* (2006.01)
*G02C 1/06* (2006.01)
*G02C 13/00* (2006.01)

(52) U.S. Cl.
CPC .............. *G02C 1/06* (2013.01); *G02C 13/001* (2013.01); *G02C 2200/02* (2013.01); *G02C 2200/08* (2013.01)

(58) Field of Classification Search
CPC .......... G02C 13/001; G02C 2200/02–2200/22; G02C 1/06; G02C 5/22; G02C 5/2281; G02C 5/229; G02C 1/08; G02C 5/02; G02C 5/10; G02C 5/20; G02C 9/00; G02C 7/12; C03C 3/062; C03C 3/125; C03C 4/0071; A45C 11/04; A45F 5/021
USPC ..... 351/47, 57, 58, 83, 86, 110, 231, 41, 49, 351/85, 91–107, 178, 219, 221
See application file for complete search history.

(56) References Cited

U.S. PATENT DOCUMENTS

| 3,869,200 A * | 3/1975 | Danylewich ............. G02C 1/06 351/178 |
| 5,546,141 A * | 8/1996 | Wheatley ................. G02C 7/12 351/41 |
| 2005/0105041 A1* | 5/2005 | Lerner .................... C03C 3/062 351/57 |
| 2007/0013863 A1* | 1/2007 | Zelazowski ............. G02C 9/00 351/47 |

* cited by examiner

*Primary Examiner* — Mustak Choudhury
(74) *Attorney, Agent, or Firm* — Lane Powell, PC

(57) ABSTRACT

The current invention is a detachable eyeglass frame system that will provide consumers a way to take their single pair of prescription lenses out of their manufacturers frames and place them into another set of the same manufacturer's frames but, of different color and/or style. The eyeglass frame system comprises an eyeglass frame including a front section removably secured to a horizontal bar. The horizontal bar is removably secured along the upper end of the front section by one or more fasteners, such as magnets. By lifting the Removable Horizontal Bar from Frame Rear, lenses easily slide out of their current frames and easily slide into their other frames.

11 Claims, 4 Drawing Sheets

EYEGLASS FRAME SYSTEM WHERE LENSES CAN MOVE FROM ONE FRAME TO ANOTHER

CROSS-REFERENCES TO RELATED APPLICATIONS

None.

STATEMENT AS TO RIGHTS TO INVENTIONS MADE UNDER FEDERALLY SPONSORED RESEARCH AND DEVELOPMENT

None

FIELD OF THE INVENTION

This invention refers to device to provide consumer with a variety of stylish eyeglass frames per one set of prescription lenses.

BACKGROUND OF THE INVENTION

Many people who wear prescription eyeglasses in order to correct a vision problem are bound to wearing a specific pair of frames comprising a pair of prescription lenses. Without a simple way to interchange lenses and frames, individuals are limited to wearing the same pair of eyeglasses every day. Conventionally, lenses are installed in a pair of frames by a professional and it is difficult to remove these lenses once they are disposed in the frame. Unfortunately, an individual is required to schedule an appointment at an optometrist's office in order to have their lenses or frames replaced. It is frustrating and time consuming to wait for an appointment and travel to the optometrist's office in order to replace eyeglass frames. Some of these individuals attempt to complete the replacement process themselves, which results in broken or bent eyeglass frames due to their fragile construction. Other individuals choose to purchase multiple eyeglasses in different styles and colors, but comprising the same prescription. It is extremely expensive to continually purchase new frames and lenses in order to coordinate with certain outfits or replace broken frames.

There exists a need for the buying and transition experience of getting eyeglass frames more enjoyable and friendly. Where no prescription will be needed to fix broken glasses or change their frames. Current technology does not allow the consumer to change their current frames themselves.

There remains room for improvement in the art.

SUMMARY OF THE INVENTION

The current invention is EYEGLASS Frames that allow the consumer to own and utilize multiple frames that can house their single set of prescribed lenses. These EYEGLASS Frames make the buying and transition experience more enjoyable and friendly. No prescription will be needed to fix broken glasses or change their frames. Current technology does not allow the consumer to change their current frames themselves. Current eyeglass frames technology does not allow the consumer to have and utilize multiple sets of frames to one set of lenses.

The detachable eyeglass frame system will provide consumers a way to take their single pair of prescription lenses out of their manufacturers frames and place them into another set of the same manufacturer's frames but, of different color and/or style. By lifting the Removable Horizontal Bar from Frame Rear, lenses easily slide out of their current frames and easily slide into their other frames. A Horizontal Bar, self guiding Magnet System as well as the Frame Click enable this functionality.

These EYEGLASS Frames relieves frustration of consumer being tied to one set of eyeglasses frames. No prescription will be needed to fix broken glasses or to change your frames.

BRIEF DESCRIPTION OF DRAWINGS

Without restricting the full scope of this invention, the preferred form of this invention is illustrated in the following drawings in which.

IDENTIFICATION OF PARTS/COMPONENTS OF INVENTION

Please note that not all EYEGLASS Frames will utilize all parts listed.

10—Frame Front—Front part of the eyeglass frame that holds the lenses in place and bridges the top of the nose.

11—Frame Front Backside—This is the Frame Front backside where the magnets will be placed and serve self guidance for the Removable Horizontal Bar.

12—Bridge—The area between the lenses that go over the nose and supports 90 percent of the weight of the eyeglasses.

14—Eye Wire/Rims—Part of the frame front into which the lenses are inserted.

15—Lens—the lens of the eyeglasses.

16—End Pieces—Extensions of the frame front to which the temples are attached.

18—Hinges—Part of the frame that connects the frame front to the temples and allows the temples to swing.

20—Temples—Parts of the frame that extend over and/or behind the ears to help hold the frame in place.

24—Nose Pads—Plastic pieces that may be attached directly to the frame or to pad arms. They help keep the frame in its proper position (Our design does not use Pad Arms).

26—Keyhole Bridge—Refers to the specific shape of bridge sits across the nose and connects the two lenses.

28—Horizontal Top Bar (Rear Only)—Removable back piece of frame that connects to rear of the Front Eye Wire/Rim and allows lens to be removed or added.
30—Magnet—Neodymium magnet providing Horizontal Bar self guidance.
32—Frame Click (Release Mechanism)—Slightly rounded and recessed to keep horizontal bar against frame front rear and serve as a way to keep horizontal bar in place (stability).
34—Frame Rear—Rear part of the eyeglass frame that holds the lenses in place and bridges the frame click.
Removable Horizontal Top Bar back frame—This is a part of the horizontal bar that is removable allowing lenses to be removed from the frame cradle holding the lenses in place.
Release Mechanism—a small plastic impression assisting with the release of the removable horizontal bar back frame.
Modified Frame with "solid horizontal bar"—Allows a pair of glasses frame to look like standard frames, however it provides the home position for the removable horizontal bar back frame and is the primary support frame for the lenses and other glasses components (temple, bridge, ear pieces, etc).

DETAILED DESCRIPTION OF THE PREFERRED EMBODIMENT

There are a number of significant design features and improvements incorporated within the invention.

The intention of this invention is to allow consumers of eye wear to purchase one set of prescription or non-prescription lenses and utilize them into a multitude of similar frames. It also allows some consumers to interchange designer lenses into the same frame.

Figure 2:
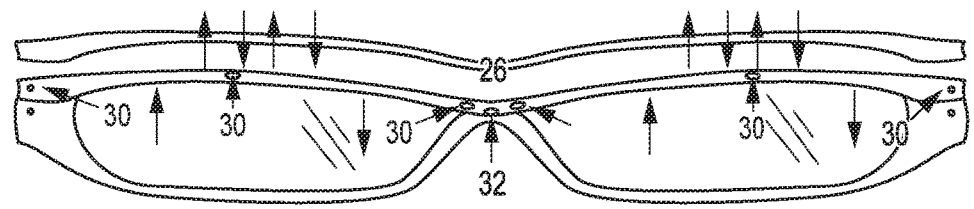
FIG. 2 shows a rear view of an embodiment of the eyeglass frame system wherein the horizontal bar is separated from the front section.
Figure 3:
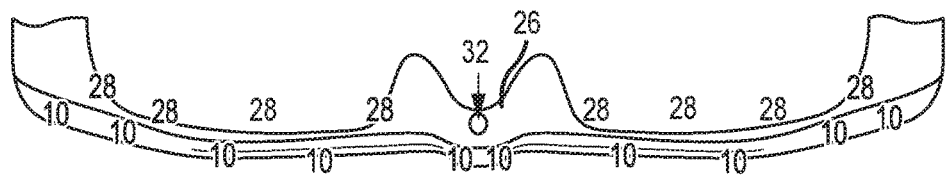
FIG. 3 shows a top down view of an embodiment of the eyeglass frame system.
Figure 6:
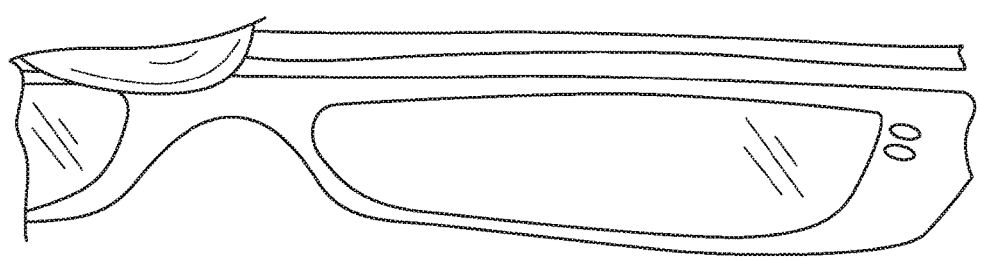
FIG. 6 shows a rear perspective view of the horizontal bar separated of the front section of the eyeglass frame system.

A standard frame normally consist of a frame front 10, frame front backside 12, eye wire/rims 14 and end piece 16. This invention focuses on specific components of the frame previously considered to be one solid piece. The major change is in the horizontal bar area (frame front 10 and removable horizontal bar 28) of a frame. Specifically there is no other invention that utilizes a two piece horizontal bar with a removable back bar 28 while maintain the frame strength of a solid front 10 horizontal bar attached to the remainder of the frame portions (bridge 12, keyhole bridge 26, eye wire/rim 14, end pieces 16, hinges 18 and temple 20). The "horizontal bar" has a front 10 and a back 28 as shown in FIG. 3. The back portion of the horizontal bar is removable 28 allowing the lens 15 to slide in its standard frame channels 14. This back removable portion of the horizontal bar 28 is locked into place by utilizing magnets 30 as shown in FIG. 2 and FIG. 6.

The "horizontal bar" front is a continuous portion of the frame 10 providing structure and durability to the frame.

The removable back of the "horizontal bar" 28 rides above the bridge section 12 of the glasses. This is important for comfort of the bridge 12/nose pieces 24 and interaction with the actual nose resting spots.

Figure 7:
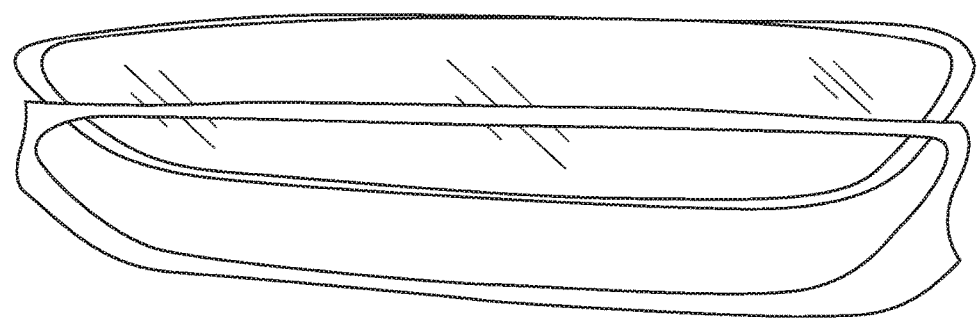
FIG. 7 shows a perspective view of a lens partially disposed in an eye rim of the front section of the eyeglass frame system.

With minimal pressure the removable portion of the "horizontal bar" 28 can be removed. This allows for the lens 15 to be simply pulled up from the lens cradle 14 as shown in FIG. 7. The removable portion is replaced by positioning the "back horizontal bar" 28 in its guiding position and the magnets 30 pull the bar into place.

At this time the lenses 15 are available to put the current lenses 15 into another pair of frames with the same lens 15 shape, but different frame color, style, design etc.

Lens 15 to the Modified Frame with "solid front horizontal bar" 10. This frame is built like most frames with a grooved cradle that the lens 15 slides into allowing for the lens 15 to be secured into the frame. The lens 15 is a standard shape, size as specified by designer or brand. The Modified Frame with "solid front horizontal bar" 10 is a unique relationship because it gives the appearance of a solid frame; however it allows the lens 15 to be slid into the frame. This allows the lenses 15 to be removed and slid into another frame with the same lens 15 shape.

The modified Frame with "solid front horizontal bar" 10 relationship to "Removable Horizontal Bar Back Frame 28 does not exist today in marketed glasses. All marketable glasses today that are not frameless or partial frames use a solid frame that entraps the lens. The proprietary nature of the eyeglass frame identifies the horizontal bar 10 as a piece of the glasses frame. The relationship between the frame and the removable horizontal bar back 28 is critical because this is the mechanism that locks the lenses 15 into place. The removable horizontal back bar 28 is held into place using Neodymium Magnets 30 in the preferred embodiment. The two pieces horizontal bar 10 and horizontal back bar 28 are manufactured with matching step surfaces and the magnets 30 hold the removable horizontal back bar 28 in place.

The relationship of the Bridge 12 to the modified frame with solid front horizontal bar 10 is important in that the bridge 12 is always continuous with no splits/break or obstructions that develops an edge point on the bridge of the nose.

The relationship of the release mechanism 32 to the removable horizontal back bar 28 and the modified frame with solid front horizontal bar 10 is to allow for a wedge release mechanism 32 to help assist with separating the horizontal back bar 28 from the modified frame with solid front horizontal bar 10 from the Neodymium Magnetic forces of the Neodymium Magnets 30.

Figure 1:
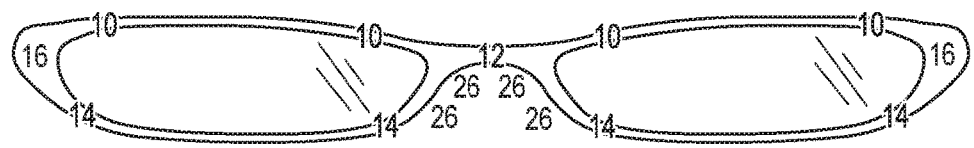
FIG. 1 shows a front view of an embodiment of the eyeglass frame system.

FIG. 1 shows a front view of eyeglasses with Frame Front 10 having multiple parts including Bridge 12 which is between the lenses 15 and goes over the nose, Eye Wire/Rims 14 which is part of the Frame Front 10 and where lenses 15 are inserted, End Pieces 16 which are extensions of the Frame Front 10 and where the Temples 20, as shown in FIG. 3 are attached, and showing Keyhole Bridge 26 underneath the Bridge 12.

FIG. 2 shows a back view of eyeglasses with Frame Click 32 serves as fastening mechanism for Removable Horizontal Bar 28, Neodymium Magnets 30 are used to fasten the Removable Horizontal Bar 28 against Frame Front Backside 11 and provide it self guidance. Where FIG. 3 shows both the Frame Front 10 and the Removable Horizontal Bar 10 securely against each other, the Frame Click 32 along with the Magnets 30 hold the Removable Horizontal Bar 28 in place securing the lenses.

This invention focuses on a major change in the "horizontal bar" 10 of the frame. The "horizontal bar" has a front 10 and a back 28. The back portion of the horizontal bar is removable allowing the lens 15 to slide in its standard frame channels 14. This back removable portion of the horizontal bar 28 is locked into place by utilizing magnets 30. The adjoining sides of the removable horizontal back bar 28 and the horizontal bar front 10 are matched surfaces allowing self-guidance which enhances the strength of the bond between the horizontal bar front 10 and the removable horizontal back bar 28 as it is adhered by the magnetic forces 30.

The "horizontal bar" front 10 is a continuous portion of the frame providing structure and durability to the frame.

The removable back of the "horizontal bar" 28 rides above the bridge section 12 of the glasses. This is important for comfort of the bridge/nose pieces 12 which may include the nose pads 24 and interaction with the actual nose resting spots.

With minimal pressure the removable portion of the "horizontal bar" 28 can be removed. This allows for the lens 15 to be simply pulled up from the lens cradle. (see FIG. 7) The removable portion is replaced by positioning the "back horizontal bar" 28 to the matched step finish guiding it into position allowing magnets 32 to pull the bar into place.

Figure 8:
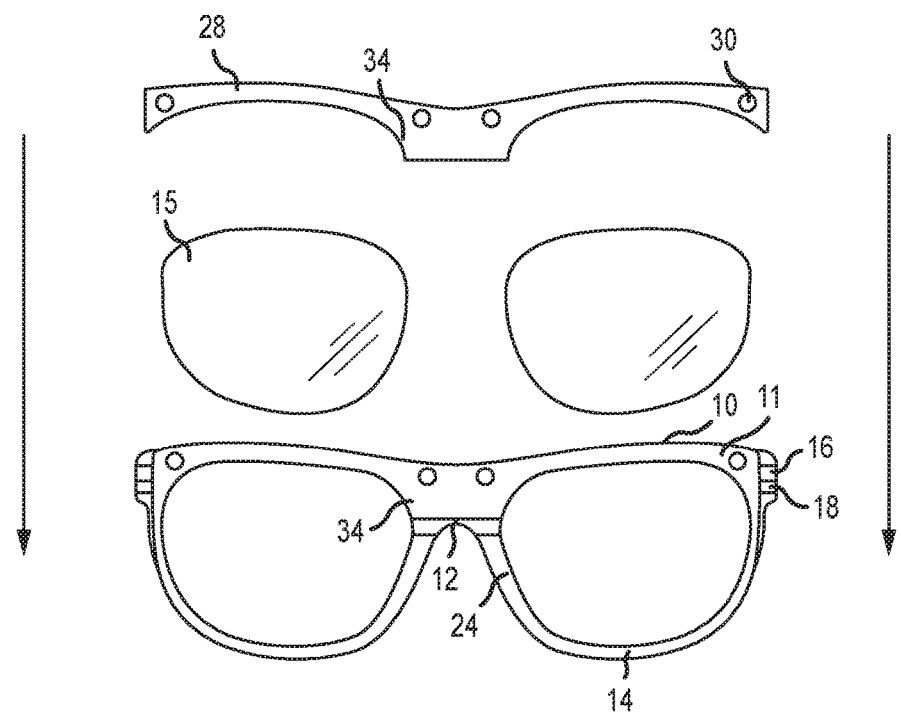
FIG. 8—This illustration shows a front view of the components of the invention.
Figure 9:
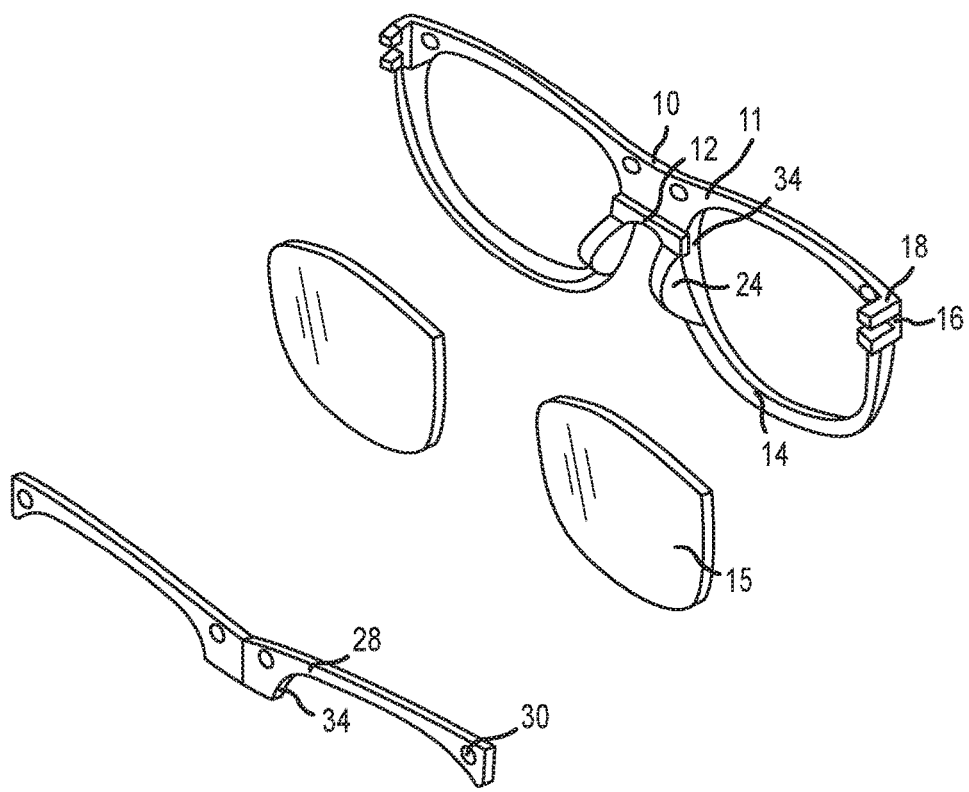
FIG. 9—This illustration shows a perspective view of the components of the invention.

The components of the current invention are shown in FIGS. 8 and 9 showing the lens, horizontal bar 10 and the removable horizontal back bar 28.

The eyeglasses frames of the current invention will function in an ordinary fashion with the following parts of the eyeglass Frames model. The 'Frame Front 10 is the front part of the eyeglass frame that holds the lenses 15 in place and bridges the top of the nose.

Figure 4:
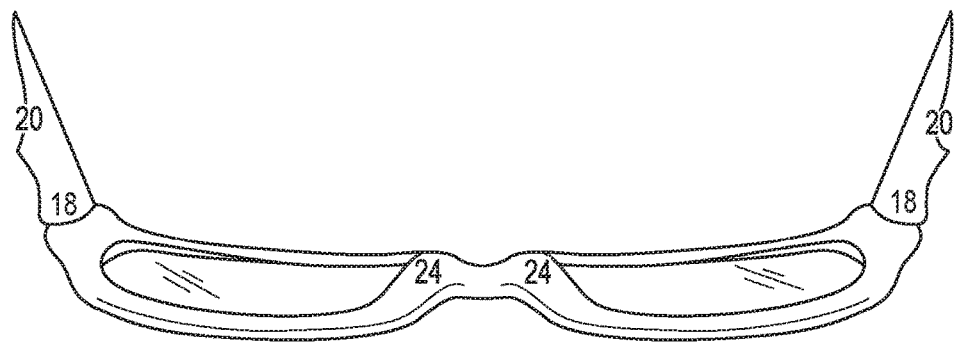
FIG. 4 shows a rear perspective view an embodiment of the eyeglass frame system.

The 'Bridge' 12 is the area between the lenses 15 that go over the nose and supports 90 percent of the weight of the eyeglasses. The 'Eye Wire/Rims 14 are where the lenses 15 are inserted. The 'End Pieces' 16 are extensions of the frame front to which the temples 20 are attached. The 'Hinges' 18 connect the frame front 10 to the temples 18 and allows the temples 20 to swing. The 'Temples' 20 extend over and/or behind the ears to help hold the frame in place. The 'Spring-Hinged Temples' 18 include hidden springs in the hinges that help keep the frame from slipping. The 'Nose Pads' 24 may be attached directly to the frame or to pad arms as shown in FIG. 4. They help keep the frame in its proper position. Note that not all models use Nose Pads 24. The 'Keyhole Bridge' 26 sits across the nose and connects the two lenses. The 'Horizontal Top Bar' (Rear Only) 28 is the removable back piece of frame that connects to rear of the Front Eye Wire/Rim 10 and allows lens 15 to be removed or added. The 'Magnets' or 'Neodymium Magnets' 30 provides Horizontal Bar 28 self guidance. The 'Frame Click' or 'Release Mechanism' 32 is slightly rounded and recessed to keep horizontal bar against frame front rear and serve as a way to keep horizontal bar in place (stability).

Eyeglasses frames are typically made of either metal or a type of plastic called cellulose-acetate. Cellulose acetate is derived from cotton and is flexible and strong.

Alternative Embodiments

Figure 5:
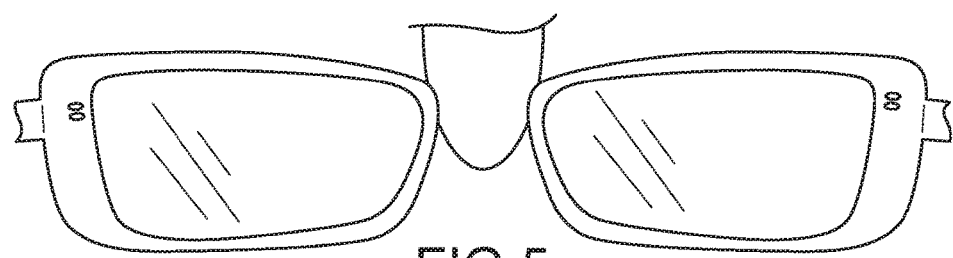
FIG. 5 shows a perspective view of an alternative embodiment of the eyeglass frame system.

Alternative embodiments consist of two main items. The attachment of the removable horizontal bar back frame 28 to the solid front horizontal bar 10 is reference utilizing magnets 30. Alternative to this is built in spring clips, locking pins, or any other functional way to securing a removable frame piece to allow lens 15 replacement or exchange as shown in FIG. 5.

The release mechanism 32 may consist of any shape, size or apparatus utilized to separate frames that consist of more than one part with the intention of replacing or exchanging the lenses.

CONCLUSION

Having the flexibility to change frames of different color, style, pattern while allowing easy transition of lenses 15 from one frame to another frame using a single pair of prescribed lenses. eyeglass Frames should also provide consumer an efficient shopping experience.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur by those skilled in the art, it is not desired to limit the invention to the exact construction and operation shown and described, and accordingly, all suitable modifications and equivalents may be resorted to, falling within the scope of the invention.

We claim:

1. An eyeglass frame system, comprising;
    an eyeglass frame base having a top edge, the frame base including a first channel and a second channel for partially enclosing a first lens and a second lens, and a bridge section;
    a removable horizontal back bar having a top edge that substantially matches the top edge of the frame base and includes a first channel and a second channel, the removable horizontal back bar first and second channels being such that when the removable horizontal back bar is attached to the frame base, the first and second channels of the frame base align with the first and second channels of the removable horizontal back bar to fully enclose and substantially in contact with a periphery of the first lens and a periphery of the second lens;
    one or more attachment elements operative to removably attach the removable horizontal back bar to the frame base, wherein the removable horizontal back bar attaches to a back region of the frame base above the bridge section; and
    a release mechanism to assist in separating the horizontal back bar from the frame base, thereby permitting the first lens and the second lens to be removed from the first and second channels of the frame base and the horizontal back bar and placed into a different eyeglass frame base.

2. The system of claim 1, wherein the attachment elements are one or more magnets.

3. The system of claim 2, wherein the magnets are neodymium magnets.

4. The system of claim 1, wherein the attachment elements are spring clips or locking pins.

5. The system of claim 1, further comprising the first and the second lens.

6. A method of providing eyeglasses to a customer, comprising;
    providing a first eyeglass frame to the customer, the first eyeglass frame including
        a first eyeglass frame base having a top edge, the first frame base including a first channel and a second channel for partially enclosing a first lens and a second lens, and a bridge section;
        a first removable horizontal back bar having a top edge that substantially matches the top edge of the first frame base and includes a first channel and a second channel, the first removable horizontal back bar first and second channels being such that when the first removable horizontal back bar is attached to the first frame base, the first and second channels of the first frame base align with the first and second channels of the first removable horizontal back bar to fully enclose and substantially in contact with a periphery of the first lens and a periphery of the second lens; and one or more attachment elements operative to removably attach the removable horizontal back bar to the first frame base, wherein the removable horizontal back bar attaches to a back region of the first frame base above the bridge section; and a release mechanism to assist in separating the horizontal back bar from the first frame base, thereby permitting the first lens and the second lens to be removed from the first and second channels of the first frame base and the horizontal back bar and placed into a different eyeglass frame base; and providing a second eyeglass frame to the customer, the second eyeglass frame including a second eyeglass frame base having a top edge, the second frame base including a first channel and a second channel for partially enclosing the first lens and the second lens, and a bridge section;

a second removable horizontal back bar having a top edge that substantially matches the top edge of the second frame base and includes a first channel and a second channel, the second removable horizontal back bar first and second channels being such that when the second removable horizontal back bar is attached to the second frame base, the first and second channels of the second frame base align with the first and second channels of the second removable horizontal back bar to fully enclose and substantially in contact with a periphery of the first lens and a periphery of the second lens; and one or more attachment elements operative to removably attach the removable horizontal back bar to the second frame base, wherein the removable horizontal back bar attaches to a back region of the second frame base above the bridge section; and a release mechanism to assist in separating the horizontal back bar from the second frame base, thereby permitting the first lens and the second lens to be removed from the first and second channels of the second frame base and the horizontal back bar and placed into a different eyeglass frame base.

7. The method of claim 6, further comprising providing the first and the second lens to the customer.

8. The method of claim 6, wherein the attachment elements are one or more magnets.

9. The system of claim 8, wherein the magnets are neodymium magnets.

10. The method of claim 6, wherein the attachment elements are spring clips or locking pins.

11. The method of claim 6, wherein the first eyeglass frame base is of a different style or color than the second eyeglass frame base.

* * * * *